Feb. 6, 1940.　　　A. ARUTUNOFF　　　2,189,659
GANG FILE
Filed Nov. 4, 1937
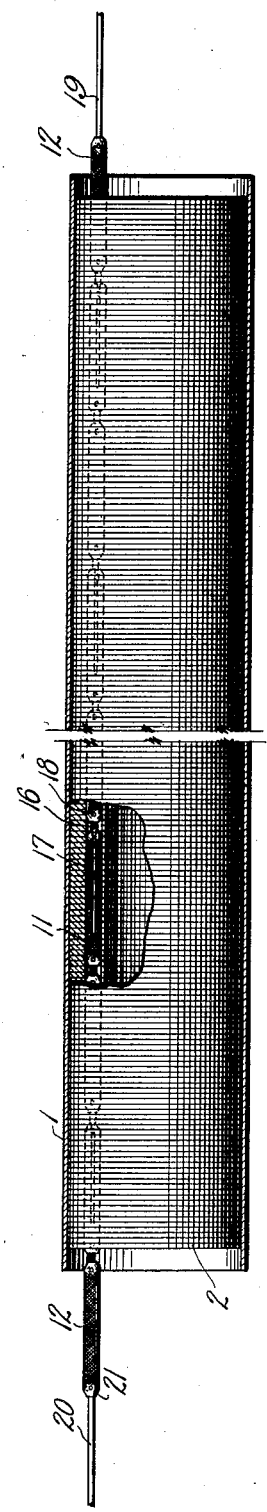
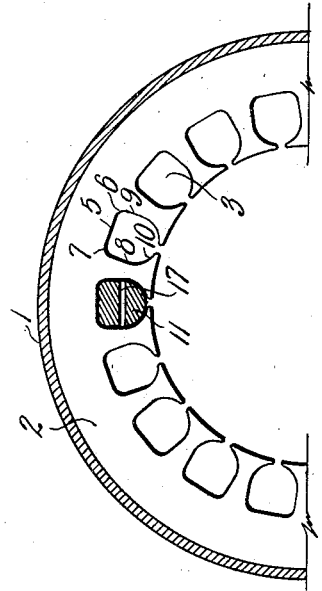
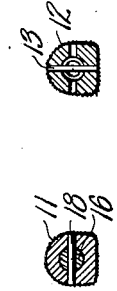
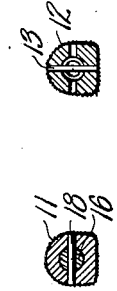
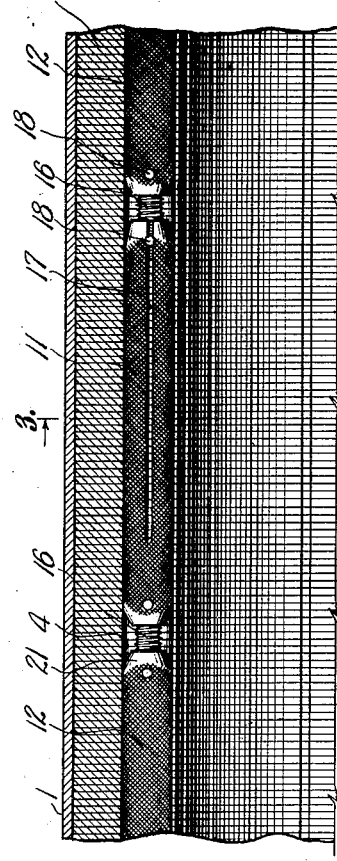
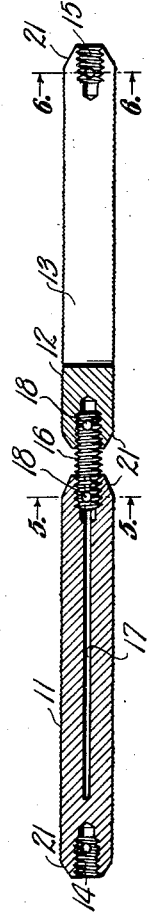
INVENTOR
Armais Arutunoff
BY
ATTORNEY Patented Feb. 6, 1940

2,189,659

UNITED STATES PATENT OFFICE 2,189,659

GANG FILE

Armais Arutunoff, Bartlesville, Okla., assignor to Reda Pump Company, Bartlesville, Okla., a corporation of Delaware Application November 4, 1937, Serial No. 172,760

6 Claims. (Cl. 29—78)

My invention relates to gang files and more particularly to a combination of files adapted to remove rough edges and the like from elongated grooves, bores or the like, of unsymmetrical, cross sectional shape.

In a motor for a deep well, submergible pump, the limitations imposed upon the diameter of the motor necessitate the use of an extremely long stator. The slots of the stator which receive the winding of the motor may often exceed 20 feet in length while their greatest cross sectional dimension will be less than one half inch. The slots in the stator are formed by a plurality of laminations usually assembled in a housing. The alignment of the laminations may not be perfect or inaccuracies in the formation thereof may result in irregularities in the slots thus formed. These irregularities are apt to injure the insulation of the winding so that they must be removed before the winding is inserted in the stator.

One object of my invention is to provide a file construction enabling the cutting of the stator slots to their final dimensions and for removing irregularities therein.

Another object of my invention is to provide a novel file construction for filing elongated bores or ducts.

Another object of my invention is to provide a novel file construction for filing bores or ducts of unsymmetrical, cross sectional shape.

Other and further objects of my invention will appear from the following description.

In the accompanying drawing which forms part of the instant specification and are to be read in conjunction therewith and in which like reference numerals are used to indicate like parts in the various views;

Figure 1 is an elevation with parts in section, of a stator assembly with a gang file embodying my invention, in place in a stator slot.

Figure 2 is a fragmentary sectional view drawn on an enlarged scale, similar to the view shown in Figure 1.

Figure 3 is a sectional view taken on a line 3—3 of Figure 2.

Figure 4 is a sectional view of a gang file embodying my invention.

Figure 5 is a sectional view taken on a line 5—5 of Figure 4.

Figure 6 is a sectional view taken on a line 6—6 of Figure 4.

More particularly referring now to the drawing, positioned within a housing 1 are a plurality of laminations 2 forming the stator of an electric motor. The laminations are provided with cutout portions 3 of unsymmetrical cross sectional shape, as can readily be seen by reference to Figure 3. The plurality of laminations in alignment form an elongated duct, providing slots 4 in which the winding of the stator is placed.

It will be observed, by reference to Figure 3, that the slots thus formed are provided with flat bottomed portions 5, filleted corners 6 and 7, straight side walls 8 and 9, and a circular upper portion 10. The gang file of my invention comprises a first file member 11 and a second file-member 12, the cross sectional shape of which corresponds to the shape of the winding slots in connection with which they are to be used. File 11 is provided with a cutaway portion 17, extending in a horizontal plane, while file 12 is provided with a cutaway portion 13, extending in a vertical plane as can readily be seen by reference to Figures 4, 5, and 6. The ends of each of the files 11 and 12 are formed with internally threaded holes 14 and 15. A plurality of files are adapted to be connected to form a gang or train, by means of a stud screw 16, as can readily be seen by reference to Figures 2 and 4. The stud screws 16 are provided with locking pins 18, adapted to prevent the studs 16 from unscrewing. A pair of pull rods 19 and 20 are adapted to be threaded in the unconnected ends of the file assembly.

The entire outer surface of the files, except the ends and the chamfered portions 21 are provided with file cutting faces, preferably double cut.

File metal is of itself highly tempered and resilient. Irregularities in planes parallel to a horizontal plane will be readily removed by file 11, while irregularities in planes parallel to the vertical plane will be readily removed by file 12. The file assembly is pulled alternately back and forth through the stator slots until the slots are filed to the desired smoothness. It will be observed that I have accomplished the objects of my invention. I have provided a gang file assembly which is capable of filing elongated slots or bores of unsymmetrical cross sectional shape.

It will be further apparent that my assembly could be used for filing cylindrical holes in which case, of course, the files will be cylindrical in cross section and assembled with the cutaway portions of the files disposed at right angles to each other as shown in Figure 4.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An elongated bifurcated file provided with cutting teeth extending over the exterior surfaces thereof and internally threaded, reentrant, longitudinally extending portions formed at opposite ends of said file.

2. A gang file comprising a pair of bifurcated file members provided with file teeth on the outer surfaces thereof, and means for connecting said file members with respective planes of bifurcation disposed at angles to each other.

3. In a gang file, a plurality of bifurcated file members, each of said members being formed with internally threaded, reentrant end portions, means threaded in adjacent end portions for interconnecting said file members, the planes of bifurcation of adjacent file members extending substantially at right angles to each other.

4. In a gang file, a pair of file members of unsymmetrical cross sectional shape, said members being provided with internally threaded, reentrant end portions, means threadable into adjacent threaded end portions for interconnecting said members, each of said members being bifurcated, the plane of bifurcation of one of said members extending at right angles to the plane of bifurcation of the other of said members.

5. In a gang file, a plurality of bifurcated, expandible file members, connecting means at both ends of said members for interconnecting them in series, the planes of bifurcation disposed at angles to each other.

6. In a gang file, a plurality of bifurcated, expandible file members having flat and rounded working surfaces, connecting means at both ends of said members for interconnecting them in series, the planes of bifurcation disposed at angles to each other.

ARMAIS ARUTUNOFF.